United States Patent [19]

Groh et al.

[11] Patent Number: 5,187,769
[45] Date of Patent: Feb. 16, 1993

[54] TRANSPARENT THERMOPLASTIC MOLDING COMPOSITION, PROCESS FOR ITS PREPARATION AND ITS USE

[75] Inventors: Werner Groh, Lich; Rudolf Heumüller, Rodgau; Gerald Schütze, Hofheim am Taunus; Roland Stern, Wiesbaden; Gerhard Wieners, Frankfurt am Main, all of Fed. Rep. of Germany

[73] Assignee: Hoechst Aktiengesellschaft, Frankfurt am Main, Fed. Rep. of Germany

[21] Appl. No.: 840,324

[22] Filed: Feb. 24, 1992

[30] Foreign Application Priority Data

Feb. 26, 1991 [DE] Fed. Rep. of Germany ....... 4105951

[51] Int. Cl.$^5$ .............................................. G02B 6/02
[52] U.S. Cl. .................................... 385/143; 385/145; 526/245
[58] Field of Search ................. 526/245; 385/143, 145

[56] References Cited

U.S. PATENT DOCUMENTS

| | | | |
|---|---|---|---|
| 4,297,466 | 10/1981 | Bloch et al. | 526/245 |
| 4,615,584 | 10/1986 | Ohmori et al. | 526/245 |
| 4,650,843 | 3/1987 | Yokoyawa et al. | 526/245 |
| 4,703,078 | 10/1987 | Maehara et al. | 524/570 |
| 4,720,166 | 1/1988 | Ohmori et al. | 526/245 |
| 4,863,236 | 9/1989 | Herbrechtsmeier et al. | 385/143 |

FOREIGN PATENT DOCUMENTS 0128517 12/1984 European Pat. Off. .
0438170 7/1991 European Pat. Off. .

*Primary Examiner*—Joseph L. Schofer
*Assistant Examiner*—N. Sarofim
*Attorney, Agent, or Firm*—Curtis, Morris & Safford

[57] ABSTRACT

Transparent thermoplastic molding composition of a polymer containing a) 10 to 95% by weight of units which are derived from a compound of the formula (I)

$$R_2^1C=CF-COO-C(CF_3)_2R^2 \qquad (I)$$

b) 90 to 5% by weight of units which are derived from one or more compounds of the formula (II)

$$R_2^3C=CF-COO-C\begin{matrix}R^4\\R^5\\R^6\end{matrix} \qquad (II)$$

and c) 0 to 85% by weight of units which are derived from a compound of the formula (III)

$$R_2^7C=CF-COO-CR_3^8 \qquad (III)$$

The molding composition is used for the production of optical objects, in particular for the production of optical fibers.

7 Claims, No Drawings

TRANSPARENT THERMOPLASTIC MOLDING COMPOSITION, PROCESS FOR ITS PREPARATION AND ITS USE

Esters of 2-fluoroacrylic acid, in particular aromatic esters, and polymers of these compounds which are distinguished by high glass transition temperatures are described in the literature (DE-B-29 50 491). However, the transmission of light by these polymers is very low because of high degrees of light scattering and absorption. Optical materials which comprise polymeric 2-fluoroacrylic acid esters, in particular esters of aliphatic alcohols, which can contain deuterium atoms both in the alcohol component and in the β-position of the 2-fluoroacrylic acid component, are furthermore known (EP-A-128 517). The polymers described have refractive indices of between 1.45 and 1.60 and glass transition temperatures of between 100 and 200° C. and are used as core materials for optical fibers (polymeric optical fibers (POFs)). Polymeric 2-fluoroacrylic acid esters of fluorine-containing alcohols are employed as the cladding materials.

The preparation of poly(2-fluoroacrylic acid fluoroalkyl esters) is also known (EP-A 128 516).

The polymers are prepared by polymerization of the monomers, initiated by free radicals, in bulk, solution or suspension in the presence of a chain transfer agent at a temperature of between 0° and 100° C. They have refractive indices of between 1.36 and 1.44 and softening points of between 80° and 140° C.

Homo- and copolymers which contain 2-fluoroacrylic acid hexafluoroisopropyl ester and are used for the production of transparent objects are furthermore known (EP-B-203 402). Glass transition temperatures of 108° C. are given for the homopolymer, and of 140°, 142° and 133° C. for copolymers of the hexafluoroisopropyl ester and the methyl ester in weight ratios of 45:55, 66:34 and 79:21. Copolymers having a high content of the methyl ester (55 or 34 parts by weight of the methyl ester) have high transition temperatures, but also high refractive indices. However, their transparency to light is inadequate because of the carbon-hydrogen bonds present in the polymer and the high degrees of absorption caused by these.

Although the transparency of polymers to light can be increased by increasing the content of hexafluoroisopropyl ester (79 or 100 % by weight), this results in a drop in the glass transition temperature, so that this is no longer adequate for many fields of use of polymeric optical fibers.

The object of the invention was to provide a polymer comprising readily accessible monomers, which has high transparency to light in the wavelength range of visible light and at the same time a high glass transition temperature, and furthermore can be processed to a thermoplastic molding composition, and to optical fibers which are suitable for long transmission lengths and high long-term service temperatures.

The invention thus relates to a transparent, thermoplastic molding composition comprising a polymer containing a) 10 to 95 % by weight of units which are derived from a compound of the formula (I)

$$R^1{}_2C=CF-COO-C(CF_3)_2R^2 \qquad (I)$$

in which $R^1$ and $R^2$ are identical or different and are a hydrogen, deuterium or fluorine atom, b) 90 to 5% by weight of units which are derived from one or more compounds of the formula (II)

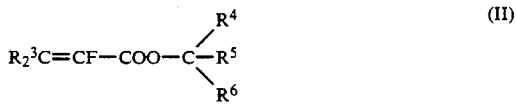

in which
$R^3$ is a hydrogen or deuterium atom,
$R^4$ and $R^5$ are identical or different and are a hydrogen or deuterium atom, a methyl or mono-, di- or trideuteromethyl group or a trifluoro- or trichloromethyl group and
$R^6$ is a methyl or mono-, di- or trideuteromethyl or trifluoromethyl group, a phenyl group, a pentafluorophenyl group, a mono-, di- or trihalogenophenyl group, a mono-, di- or tri(perfluoro-$C_1$ to $C_3$-alkyl)phenyl group or a $CH_3$-$CHF$-$CF_2$-$CH_2$- group, a $(CF_3)_3C$- group or an $X$-$(CF_2)_n$-$(CH_2)_m$- group, in which X is a hydrogen, deuterium, fluorine or chlorine atom, n is an integer from 2 to 4 and m is 0 or I, and c) 0 to 85% by weight of units which are derived from a compound of the formula (III)

$$R^7{}_2C=CF-COO-CR^8{}_3 \qquad (III)$$

in which $R^7$ and $R^8$ are identical or different and are a hydrogen or deuterium atom,
the sum of (II) and (III), based on the total amount of the polymer, being in the range from 5 to 90% by weight.

The molding composition according to the invention contains (a) 10 to 95% by weight, preferably 40 to 95% by weight, particularly preferably 50 to 90% by weight of units which are derived from a compound of the formula (I). $R^1$ and $R^2$ here are identical or different and are a hydrogen, deuterium or fluorine atom, and $R^1$ is preferably a deuterium atom. Compounds of the formula (I) are particularly preferably d3-hexafluoroisopropyl 2-fluoroacrylates.

The molding composition furthermore contains (b) 90 to 5% by weight, preferably 60 to 5% by weight, particularly preferably 50 to 10% by weight of units which are derived from one or more compounds of the formula (II) in which $R^3$ is a hydrogen or deuterium atom, preferably a deuterium atom;

$R^4$ and $R^5$ are identical or different and are a hydrogen or deuterium atom, a methyl or mono-, di- or trideuteromethyl group or a trifluoro- or trichloromethyl group, in particular a hydrogen or deuterium atom or a methyl or trideuteromethyl or trifluoromethyl group;

$R^6$ is a methyl group, a mono-, di- or trideuteromethyl group, a trifluoromethyl group, a phenyl group, a pentafluorophenyl group, a mono-, di- or trihalogenophenyl group, a mono-, di- or tri(perfluoro-$C_1$ to $C_3$-alkyl)phenyl group, a $(CF_3$-$CHF$-$CF_2$-$CH_2$ )-group, a $(CF_3)_3C$- group or an $X$-$(CF_2)_n$-$(CH_2)_m$-group, in which X is a hydrogen atom, a deuterium atom, a fluorine atom or a chlorine atom, n can be 2, 3 or 4 and m can be 0 or 1, but in particular a methyl, mono-, di- or trideuteromethyl, trifluoromethyl, trichloromethyl, pentafluoro-n-propyl, 2,2,3,3-tetrafluoro-n-propyl, 2,2,3,3-tetrafluoro-n-propyl-$d_3$ or perfluoro-tert.-butyl group, and if appropriate (c) 0 to 85% by weight, preferably 0 to 65% by weight, particularly preferably 0 to 45% by weight of units which are derived from a compound of the formula (III). In formula (III), $R^7$ and $R^6$ are identical or different and are a hydrogen or deuterium atom, preferably a deuterium atom. The amounts by weight of the compounds of the formulae (II) and (III) add up to give, based on the total amount of the polymer, 5 to 90% by weight, preferably 5 to 60% by weight and particularly preferably 10 to 50% by weight.

The thermoplastic molding composition according to the invention contains, for example, the following compounds of the formula (II):

ethyl 2-fluoroacrylate,
trifluoroethyl 2-fluoroacrylate,
trichloroethyl 2-fluoroacrylate,
pentafluoropropyl 2-fluoroacrylate,
tetrafluoropropyl 2-fluoroacrylate,
isopropyl 2-fluoroacrylate,
trifluoroisopropyl 2-fluoroacrylate,
perfluoroisopropyl 2-fluoroacrylate,
perfluoro-(2,3-dimethyl-2-butyl) 2-fluoroacrylate,
trifluoro-tert.-butyl 2-fluoroacrylate,
trichloro-tert.-butyl 2-fluoroacrylate,
ethyl 2-fluoroacrylate-$d_2$,
trifluoroethyl 2-fluoroacrylate-$d_2$,
trichloroethyl 2-fluoroacrylate-$d_2$,
pentafluoropropyl 2-fluoroacrylate-$d_2$,
tetrafluoropropyl 2-fluoroacrylate-$d_2$,
isopropyl 2-fluoroacrylate-$d_2$,
trifluoroisopropyl 2-fluoroacrylate-$d_2$,
perfluoroisopropyl 2-fluoroacrylate-$d_2$,
perfluoro-(2,3-dimethyl-2-butyl) 2-fluoroacrylate-$d_2$,
trifluoro-tert.-butyl 2-fluoroacrylate-$d_2$,
trichloro-tert.-butyl 2-fluoroacrylate-$d_2$,
$d_7$-ethyl 2-fluoroacrylate,
$d_4$-trifluoroethyl 2-fluoroacrylate,
$d_4$-trichloroethyl 2-fluoroacrylate,
$d_4$-pentafluoropropyl 2-fluoroacrylate,
$d_5$-tetrafluoropropyl 2-fluoroacrylate,
$d_8$-isopropyl 2-fluoroacrylate,
$d_9$isopropyl 2-fluoroacrylate,
$d_8$trifluoroisopropyl 2-fluoroacrylate,
$d_8$-trifluoro-tert.-butyl 2-fluoroacrylate or
$d_8$-trichloro-tert.-butyl 2-fluoroacrylate.

Compounds of the formula (II) which are particularly preferably employed are:

$d_7$-ethyl 2-fluoroacrylate,
$d_4$-trifluoroethyl 2-fluoroacrylate
$d_4$-trichloroethyl 2-fluoroacrylate,
$d_4$-pentafluoropropyl 2-fluoroacrylate,
$d_5$-tetrafluoropropyl 2-fluoroacrylate,
$d_8$-isopropyl 2-fluoroacrylate,
$d_6$-trifluoroisopropyl 2-fluoroacrylate,
$d_9$-isopropyl 2-fluoroacrylate,
perfluoro-(2,3-dimethyl-2-butyl) 2-fluoroacrylate-$d_2$,
$d_8$-trifluoro-tert.-butyl 2-fluoroacrylate and
$d_8$-trichloro-tert.-butyl 2-fluoroacrylate.

In the units of the formula III, $R^7$ is preferably a deuterium atom and $R^8$ a hydrogen atom or a deuterium atom. The molding compositions contain in particular $d_5$-methyl 2-fluoroacrylate.

The molding composition thus preferably contains $d_2$-hexafluoroisopropyl 2-fluoroacrylate or $d_3$-hexafluoroisopropyl 2-fluoroacrylate, and one or more compounds from the group comprising ethyl 2-fluoroacrylate-$d_2$,
trifluoroethyl 2-fluoroacrylate-$d_2$,
trichloroethyl 2-fluoroacrylate-$d_2$,
pentafluoropropyl 2-fluoroacrylate-$d_2$,
tetrafluoropropyl 2-fluoroacrylate-$d_2$,
isopropyl 2-fluoroacrylate-$d_2$,
trifluoroisopropyl 2-fluoroacrylate-$d_2$,
perfluoroisopropyl 2-fluoroacrylate-$d_2$,
perfluoro-(2,3-dimethyl-2-butyl) 2-fluoroacrylate-$d_2$,
trifluoro-tert.-butyl 2-fluoroacrylate-$d_2$,
trichloro-tert.-butyl 2-fluoroacrylate-$d_2$,
$d_7$-ethyl 2-fluoroacrylate,
$d_4$-trifluoroethyl 2-fluoroacrylate,
$d_4$-trichloroethyl 2-fluoroacrylate,
$d_4$-pentafluoropropyl 2-fluoroacrylate,
$d_5$-tetrafluoropropyl 2-fluoroacrylate,
$d_8$-isopropyl 2-fluoroacrylate,
$d_9$-isopropyl 2-fluoroacrylate,
$d_6$-trifluoroisopropyl 2-fluoroacrylate,
$d_8$-trifluoro-tert.-butyl 2-fluoroacrylate and
$d_8$-trichloro-tert.-butyl 2-fluoroacrylate, and if appropriate from the group comprising
$d_2$-methyl 2-fluoroacrylate or
$d_5$-methyl 2-fluoroacrylate.

If appropriate, the molding composition can additionally contain units which are derived from compounds which can be copolymerized with the monomers of the formula I, formula II and formula III.

The monomers of the formulae I, II and III in particular can also additionally be copolymerized with other vinyl compounds. Such vinyl compounds which are particularly suitable are $C_1$ to $C_6$ alkyl esters of acrylic and methacrylic acid, in particular methyl methacrylate and $d_8$-methyl methacrylate, and also styrene, styrene-$d_8$, styrene-$d_5$, pentafluorostyrene, vinyl chloride and vinyl acetate.

The weight ratio of the monomers of the formulae I, II and III to the other vinyl compounds employed as comonomers can be, for example, 60:40 to 99:1, preferably 80:20 to 99:1.

The molding compositions according to the invention can also be employed as a mixture with one another or with other polymeric molding compositions. They can be prepared by processes which are known per se, for example by suspension, emulsion, precipitation or bulk polymerization. The polymerization is preferably carried out in bulk with the aid of one or more initiators which act as free radicals. Examples of suitable initiators are azo compounds, such as azobisisobutyronitrile, azobis-(2,4,4-trimethylpent-2-ane) and azobis-tert.-butane, and organic peroxides, such as dicumyl peroxide, tert.-butyl peroxide, tert.-butyl peroctoate, tert.-butyl peroxyisopropylcarbonate, tert.-butyl hydroperoxide and tert.-butyl peroxyisobutyrate.

The amount of initiator is in the range from 0.001 to 3, preferably 0.001 to 0.3 mol per 100 mol of the monomers.

It is advantageous to carry out the polymerization in the presence of a chain transfer agent (regulator). Compounds which are particularly suitable for this are mercaptans, such as butyl mercaptan, tert.-butyl mercaptan, propylmercaptan, dodecylmercaptan, butanedithiol, pentanedithiol, phenylmercaptan, pentafluorophenylmercaptan and tert.-hexylmercaptan, and esters of mercaptoacetic acid, for example ethyl mercaptoacetate and ethylene glycol bis(mercaptoacetate).

The polymerization temperature is 20° to 180° C., preferably 50° to 150° C., particularly preferably 80° to 140° C.

The molding composition is obtained in the form of a glass-clear composition which can be deformed thermoplastically. The molding composition according to the invention has high glass transition temperatures, which are above 120° C., in particular above 130° C., particularly preferably in the range from 140° C. to 170° C., and thus surprisingly even sometimes exceed the glass transition temperatures both of the homopolymer which is derived from monomer units of the formula I and of the homopolymer which is derived from monomer units of the formula II.

Optical objects, in particular optical fibers, preferably optical fibers having a core/cladding structure, can be produced from the molding composition. The optical fibers can contain the molding composition according to the invention both in the core and in the cladding. When selecting the core and cladding material, it should be remembered that the maximum transition lengths for light signals in optical fibers is reached when the refractive indices of the core material n (C) and the cladding material n (S) of an optical fiber fulfill the following equations $$\frac{n(C)}{n(S)} > 1.01$$

In a preferred embodiment, those copolymers which contain monomer units of the formulae I, II and III, in particular in which $R^1$, $R^3$ and $R^7$ are deuterium atoms, are employed as core materials. Copolymers which contain monomer units of the formulae I and II in which $R^1$, $R^2$ and $R^3$, and $R^7$ and $R^8$ are deuterium atoms are particularly preferred. Copolymers which contain monomer units of the formula I in which $R^1$ and $R^2$ are a deuterium atom and one or more of the following compounds $d_7$-ethyl 2-fluoroacrylate,
    $d_4$-trifluoroethyl 2-fluoroacrylate,
    $d_4$-trichloroethyl 2-fluoroacrylate,
    $d_4$-pentafluoropropyl 2-fluoroacrylate,
    $d_5$-tetrafluoropropyl 2-fluoroacrylate,
    $d_8$-isopropyl 2-fluoroacrylate,
    $d_9$-isopropyl 2-fluoroacrylate,
    $d_6$-trifluoroisopropyl 2-fluoroacrylate,
    perfluoro-(2,3-dimethyl-2-butyl) 2-fluoroacrylate-$d_2$,
    $d_8$-trifluoro-tert.-butyl 2-fluoroacrylate,
    $d_8$-trichloro-tert.-butyl 2-fluoroacrylate
    or optionally $d_5$-methyl 2-fluoroacrylate, are also particularly preferred.

Copolymers which contain monomer units which are derived from compounds of the formulae I, II and III can be employed as cladding materials. Those materials which have a relatively high content of monomer units of the formula I, preferably 40 to 85% by weight, particularly preferably 50 to 80% by weight, based on the total amount of the polymer, are particularly preferred here. Polymers which contain monomer units which are derived from fluoroalkyl esters, preferably from trifluoroethyl esters, pentafluoropropyl esters and hexafluoroisopropyl esters, or from perfluoro-2,3-dimethyl-2-butyl esters of 2-fluoroacrylic acid and of 2,3-difluoroacrylic acid are particularly suitable for use as cladding materials for the optical fibers according to the invention.

In another preferred embodiment, copolymers which contain monomer units which are derived from tetrafluoroethylene, from perfluoroalkyl vinyl ethers and from methyl perfluoro-3-oxa-4-pentene-1-carboxylate or from methyl perfluoro-4-oxa-5-hexene-1-carboxylate or from perfluoro-(dimethyldioxol) are employed as cladding material.

Optical fibers of the polymers according to the invention have an exceptionally good transmission of light, so that they can also be employed beyond the wavelength range of visible light, for example at 850 nm, so that long transmission lengths for light signals are additionally also rendered possible in such wavelength ranges.

Because of the high long-term service temperatures, optical fibers made from the materials according to the invention are particularly suitable for sectors where high temperature requirements are imposed on the materials, such as, for example, in the automobile industry.

EXAMPLES

Examples 1 to 3 and Comparison Examples V1 to V4 0.005% by weight of tert.-butyl peroxyisopropylcarbonate, 0.005% by weight of tert.-butyl hydroperoxide and butyl mercaptan were added to a mixture of hexafluoroisopropyl 2-fluoroacrylate (formula I, for the meaning of $R^1$ and $R^2$ see Table 1) and a 2-fluoroacrylic acid ester of the formula II (for the meaning of $R^3$, $R^4$, $R^5$ and $R^6$ see Table 1; the sum of monomers I and II gives 100% by weight) and the mixture was filtered by means of a membrane filter (pore width 45 nm) and introduced into a glass vessel which had been rinsed free from particles. The mixture was degassed by passing through helium gas (20 minutes), during which the oxygen partial pressure above the mixture was reduced to one thousandth of the saturation value (under standard conditions). The mixture was cooled to −78° C. in the helium atmosphere and evacuated. The glass vessel was then sealed off by melting and the product was heated first at 65° C. for 15 hours and then at 90° C. for 15 to 35 hours, until the composition had solidified in vitreous form. The bath temperature was then increased to 140° C. in the course of 10 hours for a further 24 hours. After the reaction mixture had been cooled, a glass-clear polymer which had the following properties (see Table 1) was obtained.

TABLE 1

| Example | Composition $MR^1$:I:II (% by wt.) | Structure of the monomer units | | | | | | Viscosity No. (in ml/g) | Residual monomer content I | II in % by wt. | Refractive index | Glass transition temperature in °C. |
|---|---|---|---|---|---|---|---|---|---|---|---|---|
| | | $R^1$ | $R^2$ | $R^3$ | $R^4$ | $R^5$ | $R^6$ | | | | | |
| 1 | 0.5:30:70 | H | H | H | H | H | $CF_3$ | 89 | 0.01 | <0.01 | 1.377 | 140 |
| 2 | 0.5:60:40 | H | H | H | H | H | $CF_3$ | 76 | 0.08 | <0.01 | 1.364 | 155 |
| 3 | 0.5:85:15 | H | H | H | H | H | $CF_3$ | 55 | 0.1 | <0.01 | 1.356 | 121 |
| 4 | 0.5:40:60 | H | H | H | H | $CH_3$ | $CH_3$ | 60 | 0.02 | 0.25 | 1.366 | 121 |
| 5 | 0.33:60:40 | H | H | H | H | $CH_3$ | $CH_3$ | 82 | 0.15 | 0.17 | 1.385 | 125 |
| 6 | 0.2:70:30 | H | H | H | H | $CH_3$ | $CH_3$ | 120 | 0.1 | 0.05 | 1.397 | 121 |

TABLE 1-continued

| Ex- ample | Composition MR[1]:I:II (% by wt.) | Structure of the monomer units | | | | | | Viscosity No. (in ml/g) | Residual monomer content | | Refractive index | Glass transition temperature in °C. |
|---|---|---|---|---|---|---|---|---|---|---|---|---|
| | | $R^1$ | $R^2$ | $R^3$ | $R^4$ | $R^5$ | $R^6$ | | I | II | | |
| | | | | | | | | | in % by wt. | | | |
| 7 | 0.8:30:70 | H | H | H | H | H | $C_2F_5$ | 59 | 0.04 | <0.01 | 1.365 | 129 |
| 8 | 0.5:50:50 | H | H | H | H | H | $C_2F_5$ | 102 | 0.16 | <0.01 | 1.361 | 142 |
| 9 | 0.3:70:30 | H | H | H | H | H | $C_2F_5$ | 91 | 0.3 | 0.05 | 1.356 | 133 |
| Comparison Ex. | | | | | | | | | | | | |
| V1 | 0.5:100:0 | H | H | — | — | — | — | 49 | 0.2 | — | 1.348 | 108 |
| V2 | 0.5:0:100 | — | — | H | H | H | $CF_3$ | 110 | — | 0.26 | 1.38 | 104 |
| V3 | 0.5:0:100 | — | — | H | H | $CH_3$ | $CH_3$ | 88 | — | 0.31 | 1.443 | 92 |
| V4 | 0.5:0:100 | — | — | H | H | H | $C_2F_5$ | 103 | — | 0.05 | 1.371 | 105 |

[1]Concentration of the molecular weight regulator (MR) in % by weight
Example 1 to 3: butyl mercaptan
Examples 4 to 6: butyl dimercaptan
Examples 7 to 9: ethyl mercaptoacetate
Comparison Examples V1 to V4: butyl mercaptan The viscosity number (in ml/g) was determined on solutions of the polymer (1% by weight) in ethyl acetate (99% by weight) at 25° C.

The residual monomer content (based on 100% by weight of the polymer) was determined by gas chromatography with the aid of an internal standard on solutions of 5% by weight of the polymer in 100% by weight of a suitable solvent.

The refractive index was measured with the aid of an Abbe refractometer on cast films which had been dried until the measurement value was constant and had been produced from solutions of the polymer in a suitable low-boiling solvent.

The glass transition temperature was determined by means of differential calorimetry (DSC) at a heating-up rate of 20° C./minute.

Examples 4 to 6

0.005% by weight of tert.-butyl peroxyisopropylcarbonate, 0.005% by weight of tert.-butyl hydroperoxide and butyl dimercaptan were added to a mixture of hexafluoroisopropyl 2-fluoroacrylate (formula I, for the meaning of $R^1$ and $R^2$ see Table 1) and isopropyl 2-fluoroacrylate (ester of the formula II, for the meaning of $R^3$, $R^4$, $R^5$ and $R^6$ see Table 1; the sum of I and II gives 100% by weight) in accordance with the data in Table 1. Further treatment of this mixture was carried out in a manner corresponding to the information on Examples 1 to 3.

Examples 7 to 9

0.005% by weight of tert.-butyl peroxyisopropylcarbonate, 0.005% by weight of tert.-butyl hydroperoxide and ethyl mercaptoacetate were added to a mixture of hexafluoroisopropyl 2-fluoroacrylate (formula I, for the meaning of $R^1$ and $R^2$ see Table 1) and pentafluoro-n-propyl 2-fluoroacrylate (ester of the formula II, for the meaning of $R^3$, $R^4$, $R^5$ and $R^6$ see Table 1; the sum of I and II gives 100% by weight) in accordance with the data in Table 1. Further treatment of this mixture was carried out in a manner corresponding to the information on Examples 1 to 3.

Comparison Examples V5 to V8

0.02% by weight of tert.-butyl peroxyisopropylcarbonate and 0.5% by weight of butyl mercaptan were added to a mixture of methyl 2-fluoroacrylate (formula III, for the meaning of $R^7$ and $R^8$ see Table 2) and an alkyl 2-fluoroacrylate of the formula II (for the meaning of $R^3$, $R^4$, $R^5$ and $R^6$ see Table 2). As described above, the mixture was filtered, introduced into a vessel, degassed and polymerized in a glass ampoule, which had been sealed off by melting, under the abovementioned conditions. After the reaction mixture had been cooled, a glass-clear polymer which had the following properties (see Table 2) was obtained.

The viscosity number was determined in acetone instead of in ethyl acetate.

TABLE 2

| Ex- ample | Composition III:II (% by wt.) | Structure of the monomer units | | | | | | Viscosity No. (in ml/g) | Residual monomer content III:II in % by wt. | Refractive index | Glass transition temperature in °C. |
|---|---|---|---|---|---|---|---|---|---|---|---|
| | | $R^3$ | $R^4$ | $R^5$ | $R^6$ | $R^7$ | $R^8$ | | | | |
| V5 | 30:70 | H | H | H | $CF_3$ | H | H | 165 | 0.03 0.14 | 1.402 | 121 |
| V6 | 50:50 | H | H | H | $CF_3$ | H | H | 162 | 0.12 0.09 | 1.415 | 125 |
| V7 | 70:30 | H | H | H | $CF_3$ | H | H | 168 | 0.10 0.05 | 1.434 | 131 |
| V8 | 100:0 | — | — | — | — | H | H | 182 | 0.02 — | 1.461 | 141 |

Example 10 and 11

0.02% by weight of di-tert-butyl peroxide and 0.5% by weight of butyl mercaptan were added to a mixture of hexafluoroisopropyl 2-fluoroacrylate (HIFA, formula I where $R^1$ and $R^2$ are hydrogen), trifluoroethyl 2-fluoroacrylate (TEFA, formula II where $R^3$, $R^4$ and $R^5$ are hydrogen and $R^6$ is trifluoromethyl) and methyl 2-fluoroacrylate (MFA, formula III where $R^7$ and $R^8$ are hydrogen), which contains the three monomers as shown in Table 3 (sum=100% by weight). As described above, the mixture was filtered, introduced into a vessel, degassed and polymerized in a glass ampoule, which had been sealed off by melting, at a bath temperature of 85° C. as described under Example 1. The bath temperature was then increased to 140° C. After the reaction mixture had been cooled, a glass-clear polymer which had the following properties (see Table 3) was obtained.

-continued weight ethyl acetate, 25° C.)

TABLE 3

| Example | Composition HIFA:TEFA:MFA (% by wt) | Viscosity No. (in ml/g) | Residual monomer content | | | Refractive index | Glass transition temperature in °C. |
| --- | --- | --- | --- | --- | --- | --- | --- |
| | | | HIFA | TEFA | MFA | | |
| 10 | 60:35:5 | 75 | 0.15 | 0.08 | 0.02 | 1.366 | 148 |
| 11 | 70:10:20 | 71 | 0.22 | 0.05 | 0.11 | 1.374 | 149 |

Examples 12 to 15

0.02% by weight of azobis(2,4,4-trimethylpent-2-ane), 0.005% by weight of tert.-butyl hydroperoxide and 0.5% by weight of butyl mercaptan were added to a mixture of hexafluoroisopropyl 2-fluoroacrylate (formula I, for the meaning of $R^1$ and $R^2$ see Table 4), another alkyl 2-fluoroacrylate of the formula II (for the meaning of $R^3$, $R^4$, $R^5$ and $R^6$ see Table 4) and methyl 2-fluoroacrylate (MFA, formula III, for the meaning of $R^7$ and $R^8$ see Table 4; the sum of the three monomers gives 100% by weight), and the mixture was filtered by means of a membrane filter (pore width 45 nm) and introduced into a glass vessel which had been rinsed free from particles. The mixture was degassed by bubbling argon gas through the mixture for a period of 40 minutes, during which the oxygen partial pressure above the mixture was reduced to one thousandth of the saturation value (under standard conditions). The mixture was cooled to −78° C. in an argon atmosphere and evacuated. The glass vessel was then sealed off by melting and the product was first heated at 85° C. for 15 to 35 hours, until the composition in the ampoule had solidified in vitreous form. The bath temperature was then increased to 145° C. for a further 24 hours. After the reaction mixture had been cooled, a glass-clear polymer which had the following properties (see Table 4) was obtained.

TABLE 4

| Example | Composition I:II:III (% by wt.) | Structure | | | | | | | | Viscosity No. (in ml/g) | Residual monomer content (sum, in % by wt.) | Refractive index | Glass transition temperature in °C. |
| --- | --- | --- | --- | --- | --- | --- | --- | --- | --- | --- | --- | --- | --- |
| | | $R^1$ | $R^2$ | $R^3$ | $R^4$ | $R^5$ | $R^6$ | $R^7$ | $R^8$ | | | | |
| 12 | 65:20:15 | D | H | D | H | H | $CF_3$ | D | H | 73 | 0.22 | 1.371 | 149 |
| 13 | 65:20:15 | D | D | D | H | H | $CF_3$ | D | D | 72 | 0.28 | 1.371 | 149 |
| 14 | 65:20:15 | D | D | D | D | D | $CF_3$ | D | D | 73 | 0.23 | 1.373 | 151 |
| 15 | 50:5:45 | D | D | D | D | $CD_3$ | $CD_3$ | D | D | 83 | 0.35 | 1.398 | 145 |

Example 16

12.5 g of azobisisobutyronitrile (AIBN) were added to 10 kg of methyl ethyl ketone and 5 kg of hexafluoroisopropyl 2,3-difluoroacrylate, nitrogen gas was bubbled through and the mixture was stirred in a nitrogen atmosphere at 60° C. for 48 hours. The product was then precipitated in petroleum spirit (boiling range 60° to 80° C.) and collected by means of a filter. The product was then dried to constant weight and had the following properties:

| Yield: | 91% |
| --- | --- |
| Glass transition temperature: | 95° C. |
| Refractive index: | 1.341 |
| Viscosity number (1% strength by weight in 100% strength by | 38 ml/g |

Example 17

Teflon AF 1600, a commercial product from DuPont comprising tetrafluoroethylene and perfluoro(dimethyldiol), was irradiated with 100 kGy of γ-radiation from a $^{60}$Co source. The polymer was then thermally aftertreated at 250° C. in vacuo. The viscosity number (0.5% in Hostinert 272, a commercial product from Hoechst AG, as the solvent at 70° C.) decreased from 90 ml/g to 27 ml/g due to this treatment.

Example 18

A polymer which had been prepared as described in Example 2 was melted in a ram extruder and extruded to give the core of an optical fiber. The polymer according to Example 16 was fed into a twin-screw extruder with a degassing zone and processed to give the cladding of the optical fiber. The properties of the optical fiber are described in Table 5.

Example 19

A polymer which had been prepared as described in Example 8 was melted in a ram extruder and extruded to give the core of an optical fiber. A polymer which had been prepared as described in Example 17 was melted in a ram extruder, sintering together and processed to give the cladding of the optical fiber. The properties of the optical fiber are described in Table 5.

Example 20

A polymer which had been prepared as described in Example 12 was melted in a ram extruder and extruded to give the core of an optical fiber. A copolymer which is derived to the extent of 68% by weight from tetrafluoroethylene and to the extent of 32% by weight from perfluoropropyl vinyl ether (melt flow index: 13 g/10 minutes at 230° C.; 3.8 kg load) was fed into a twin-screw extruder with a degassing zone and processed to give the cladding of the optical fiber. The properties of the optical fiber are described in Table 5.

Example 21

A polymer which had been prepared as described in Example 13 was melted in a ram extruder and extruded to give the core of an optical fiber. A copolymer which is derived to the extent of 68% by weight from tetrafluoroethylene and to the extent of 32% by weight from perfluoropropyl vinyl ether (melt flow index: 13 g/10 minutes at 230° C.; 3.8 kg load) was fed into a twin-screw extruder with a degassing zone and processed to give the cladding of the optical fiber. The properties of the optical fiber are described in Table 5.

Example 22

A polymer which had been prepared as described in Example 14 was melted in a ram extruder and extruded to give the core of an optical fiber. A copolymer which is derived to the extent of 68% by weight from tetrafluoroethylene to the extent of 68% by weight from tetrafluoroethylene and to the extent of 32% by weight from perfluoropropyl vinyl ether (melt flow index: 13 g/10 minutes at 230° C.; 3.8 kg load) was fed into a twin-screw extruder with a degassing zone and processed to give the cladding of the optical fiber. The properties of the optical fiber are described in Table 5.

Example 23

A polymer which had been prepared as described in Example 15 was melted in a ram extruder and extruded to give the core of an optical fiber. A polymer which had been prepared as described in Example 3 was melted in a ram extruder and processed to give the cladding of the optical fiber. The properties of the optical fiber are described in Table 5.

Example 24

A polymer which had been prepared as described in Example 11 was melted in a ram extruder and extruded to give the core of an optical fiber. A copolymer which is derived to the extent of 60% by weight from tetrafluoroethylene, to the extent of 34% by weight from perfluoropropyl vinyl ether and to the extent of 6% by weight from methyl perfluoro-3-oxy-4-pentene-1-carboxylate (melt flow index: 13 g/10 minutes at 230° C.; 3.8 kg load) was fed into a twin-screw extruder with a degassing zone and processed to give the cladding of the optical fiber. The properties of the optical fiber are described in Table 5.

TABLE 5

| Example | Damping 650 nm dB/km | Damping 830 nm dB/km | Damping at 650 nm after 2 hrs in a heating cabinet dB/km | °C. | Damping at 650 nm after the bending test in dB/km |
|---|---|---|---|---|---|
| 18 | 50 | | 55 | 110 | 90 |
| 19 | 45 | | 54 | 110 | 48 |
| 20 | 44 | 129 | 70 | 110 | 61 |
| 21 | 30 | 84 | 46 | 110 | 52 |
| 22 | 25 | 37 | 51 | 110 | 40 |
| 23 | 27 | 35 | 39 | 110 | 40 |
| 24 | 55 | | 58 | 110 | 65 |

The damping was determined on pieces of the optical fiber 30 m long by feeding in light of a wavelength (650 nm, 830 nm) from one end of the optical fiber and measuring the light intensity at the other end as a function of the length of the optical fiber, which was shortened by a certain length after each measurement. A logarithmic plot of the light intensities against the length of the optical fiber in km gives the damping D as the gradient according to the following equation:

$$D = \frac{10}{L_1 - L_2} \log \frac{I_{(L1)}}{I_{(L2)}}$$

$L_1$ = Length of the unshortened optical fiber
$L_2$ = Length of the shortened optical fiber
$I_{(L)}$ = Transmitted light intensity as a function of the length of the optical fiber.

To test the heat resistance, a section of the optical fiber was in each case kept at the stated temperatures in normal ambient air for two hours and the damping was then measured.

To test the flexural strength ("bending test"), an optical fiber 20 m long (diameter 0.5 mm) was clamped in the damping measuring device, the damping was determined and a section of this optical fiber 150 cm long (L=150) was wound round a rod of 30 mm diameter. The optical fiber was removed again from the rod and straightened out. The transmitted light intensity was then measured again and the increase in damping as a result of the deformation of the optical fiber ($D_{Def}$), expressed in dB/km, was added to the damping of the undamaged optical fiber.

$$D_{Def} = \frac{10}{L} \cdot \log \frac{I_{before}}{I_{after}}$$

$I_{before}$ = transmitted light intensity before the deformation
$I_{after}$ = transmitted light intensity after the deformation

We claim:

1. An optical fiber having a core/cladding structure, the core of which comprises a polymer of refractive index n(C) and the cladding of which comprises a polymer of refractive index n(S), in which n(C)/n(S) > 1.01, in which the core of the optical fiber comprises a molding composition of a polymer containing
   a) 10 to 95% by weight of units which are derived from a compound of the formula (I)

$$R^1{}_2C{=}CF{-}COO{-}C(CF_3)_2{-}R^2 \qquad (I)$$

in which $R^1$ and $R^2$ are identical or different and are a hydrogen, deuterium or fluorine atom,
   b) 90 to 5% by weight of units which are derived from one or more compounds of the formula (II)

$$R_2{}^3C{=}CF{-}COO{-}C{\diagup}{\diagdown}{\begin{array}{c}R^4\\R^5\\R^6\end{array}} \qquad (II)$$

in which $R^3$ is a hydrogen or deuterium atom, $R^4$ and $R^5$ are identical or different and are a hydrogen or deuterium atom, a methyl or mono-, di- or trideuteromethyl group or a trifluoro- or trichloromethyl group; $R^6$ is a methyl or mono-, di- or trideuteromethyl or trifluoromethyl group, a phenyl group, a pentafluorophenyl group, a mono-, di- or trihalogenophenyl group, a mono-, di- or tri(perfluoro-$C_1$ to $C_3$-alkyl)phenyl group or a $CF_3$-CHF-$CF_2$-$CH_2$- group, a $(CF_3)_3C$- group or an X-$(CF_2)_n$-$(CH_2)_m$- group, in which X is a hydrogen, deuterium, fluorine or chlorine atom, n is an integer from 2 to 4 and m is 0 or 1, and c) 0 to 85% by weight of units which are derived from a compound of the formula (III)

$$R^7{}_2C=CF-COO-CR^8{}_3 \quad (III)$$

in which $R^7$ and $R^8$ are identical or different and are a hydrogen or deuterium atom, the sum of (II) and (III), based on the total amount of the polymer, being in the range from 5 to 90% by weight.

2. An optical fiber as claimed in claim 1, in which the cladding comprises a polymer which contains units which are derived from fluoroalkyl esters of 2-fluoroacrylic acid.

3. An optical fiber as claimed in claim 1, in which the cladding comprises a polymer which contains units which are derived from fluoroalkyl esters of 2,3-difluoroacrylic acid.

4. An optical fiber as claimed in claim 1, in which the cladding contains polymers which are derived from hexafluoroisopropyl 2-fluoroacrylate.

5. An optical fiber as claimed in claim 1, in which the cladding comprises a polymer which contains units which are derived from tetrafluoroethylene, from perfluoroalkyl vinyl ethers or from methyl perfluoro-3-oxa-4-pentene-1-carboxylate, methyl perfluoro-4-oxa-5-hexene-1-carboxylate or from perfluoro(dimethyldioxol).

6. The optical fiber as claimed in claim 1, wherein the cladding comprises a copolymer which contains units which are derived from tetrafluoroethylene and from perfluoro(dimethyldioxol).

7. An optical fiber having a core/cladding structure, the core of which comprises a polymer of refractive index n(C) and the cladding of which comprises a polymer of refractive index n(S), in which n(C)/n(S)>1.01, in which the core of the optical fiber comprises a molding composition of a polymer containing a) 10 to 95% by weight of units which are derived from a compound of the formula (I)

$$R^1{}_2C=CF-COO-C(CF_3)_2-R^2 \quad (I)$$

in which $R^1$ and $R^2$ are identical or different and are a hydrogen, deuterium or fluorine atom;

b) 90 to 5% by weight of units which are derived from one or more compounds of the formula (II)

$$R_2{}^3C=CF-COO-C\begin{matrix}R^4\\R^5\\R^6\end{matrix} \quad (II)$$

in which $R^3$, $R^4$ and $R^5$ are H and $R^3$ is $CF_3$; and c) 0 to 85% by weight of units which are derived from a compound of formula (III)

$$R^7{}_2C=CF-COO-CR^8{}_3 \quad (III)$$

in which $R^7$ and $R^8$ are identical or different and are a hydrogen or deuterium atom, the sum of (II) and (III) based on the total amount of the polymer being in the range from 5 to 90% by weight.

* * * * *